(12) United States Patent
Vetrovec

(10) Patent No.: US 6,339,605 B1
(45) Date of Patent: Jan. 15, 2002

(54) ACTIVE MIRROR AMPLIFIER SYSTEM AND METHOD FOR A HIGH-AVERAGE POWER LASER SYSTEM

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/505,399

(22) Filed: Feb. 16, 2000

(51) Int. Cl.[7] .......................... H01S 3/04; H01S 3/093; H01S 3/091; H01S 3/00
(52) U.S. Cl. ...................... 372/35; 372/72; 372/75; 359/333
(58) Field of Search .............................. 372/35, 72, 75, 372/34, 36; 359/333, 342

(56) References Cited

U.S. PATENT DOCUMENTS

| | | |
|---|---|---|
| 4,657,358 A | 4/1987 | Anthony et al. |
| 4,837,771 A | 6/1989 | Baer |
| 5,553,088 A | 9/1996 | Brauch et al. |
| 5,579,333 A | 11/1996 | Neil et al. |
| 5,610,751 A | 3/1997 | Sweeney et al. |
| 5,661,738 A | 8/1997 | Yasui et al. |
| 5,699,372 A | 12/1997 | Okazaki |
| 5,703,893 A | 12/1997 | Komiyama et al. |
| 5,796,761 A | 8/1998 | Injeyan et al. |
| 5,832,015 A | 11/1998 | Goto et al. |
| 5,856,996 A | 1/1999 | Durkin et al. |
| 5,872,803 A | 2/1999 | Mori et al. |
| 5,872,804 A | 2/1999 | Kan et al. |
| 5,875,206 A | 2/1999 | Chang |
| 5,903,583 A | 5/1999 | Ullman et al. |

OTHER PUBLICATIONS

"Solid State Thin Disc Laser" by H. Hugel and W. L. Bohn; SPIE vol. 3574; 0277–786X/98.

Primary Examiner—Frank G. Font
Assistant Examiner—Armando Rodriguez
(74) Attorney, Agent, or Firm—Harness Dickey & Pierce P.L.C.

(57) ABSTRACT

An active mirror amplifier (AMA) laser module incorporating an optically transparent, rigid substrate having a plurality of cooling passages has one surface thereof disposed against a laser gain medium disk. The substrate also has a plurality of microchannels disposed near or at an outer surface thereof which is in contact with an outer surface of the disk. A cooling medium is circulated through the flow passages and the cooling microchannels to help keep the disk cool during use of the laser. This allows the laser module to operate at significantly increased power without overheating. In one preferred embodiment the disk is attached to the substrate using a pressure differential between a front surface of the disk and the pressure of the coolant. This eliminates attachment-induced thermal stresses of prior art designs and allows the laser to operate at increased power without fracturing the substrate. Preforming the laser medium to achieve a generally flat condition when lasing in an unrestrained condition is also disclosed, which also reduces thermal attachment stresses and allows the laser to operate at a higher power without fracturing the substrate. A preferred implementation of the laser module in constructing a power amplifier is also disclosed, as is the use of multiple optical pump sources and optical fibers for delivering the optical energy to the laser module.

24 Claims, 12 Drawing Sheets

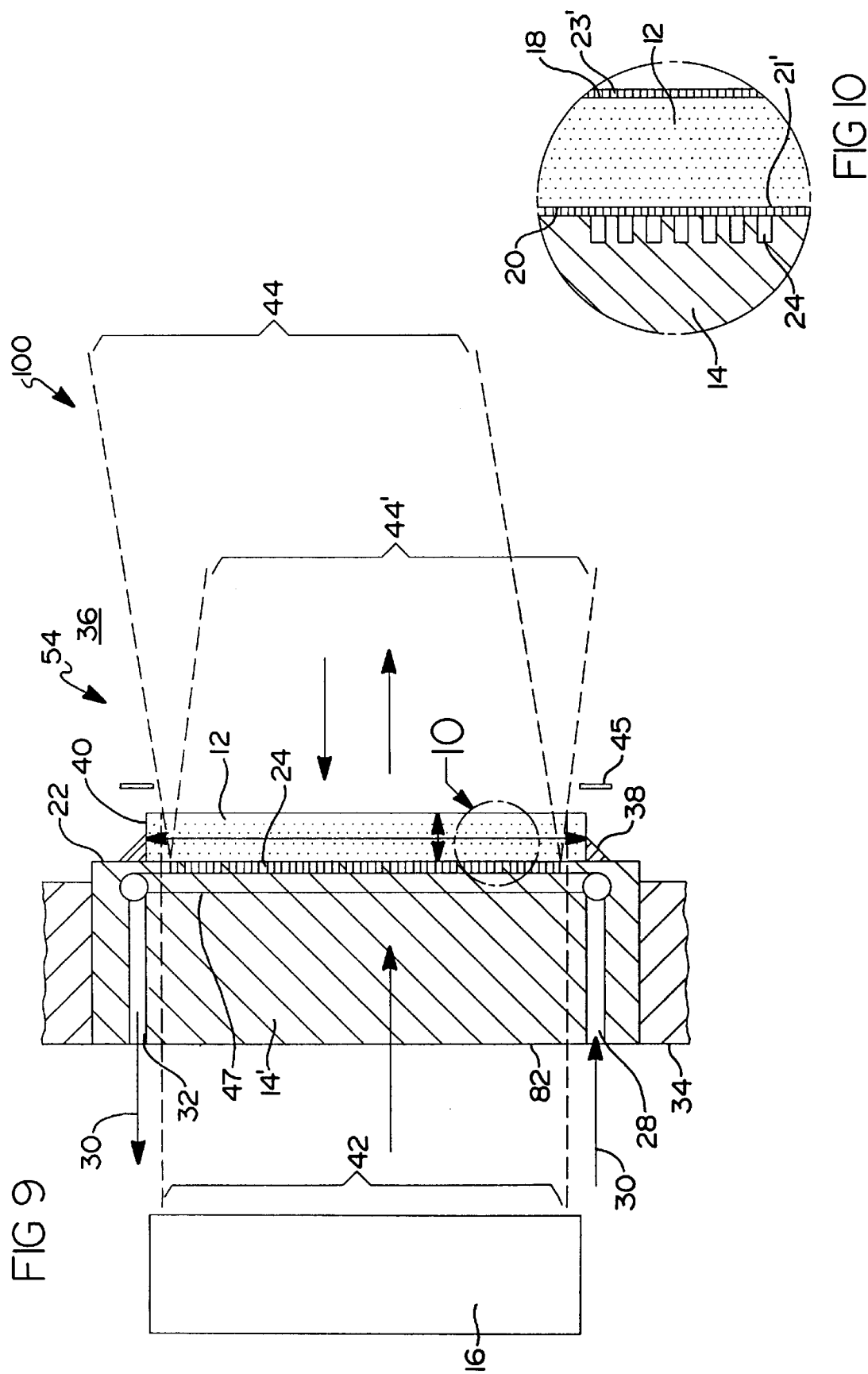

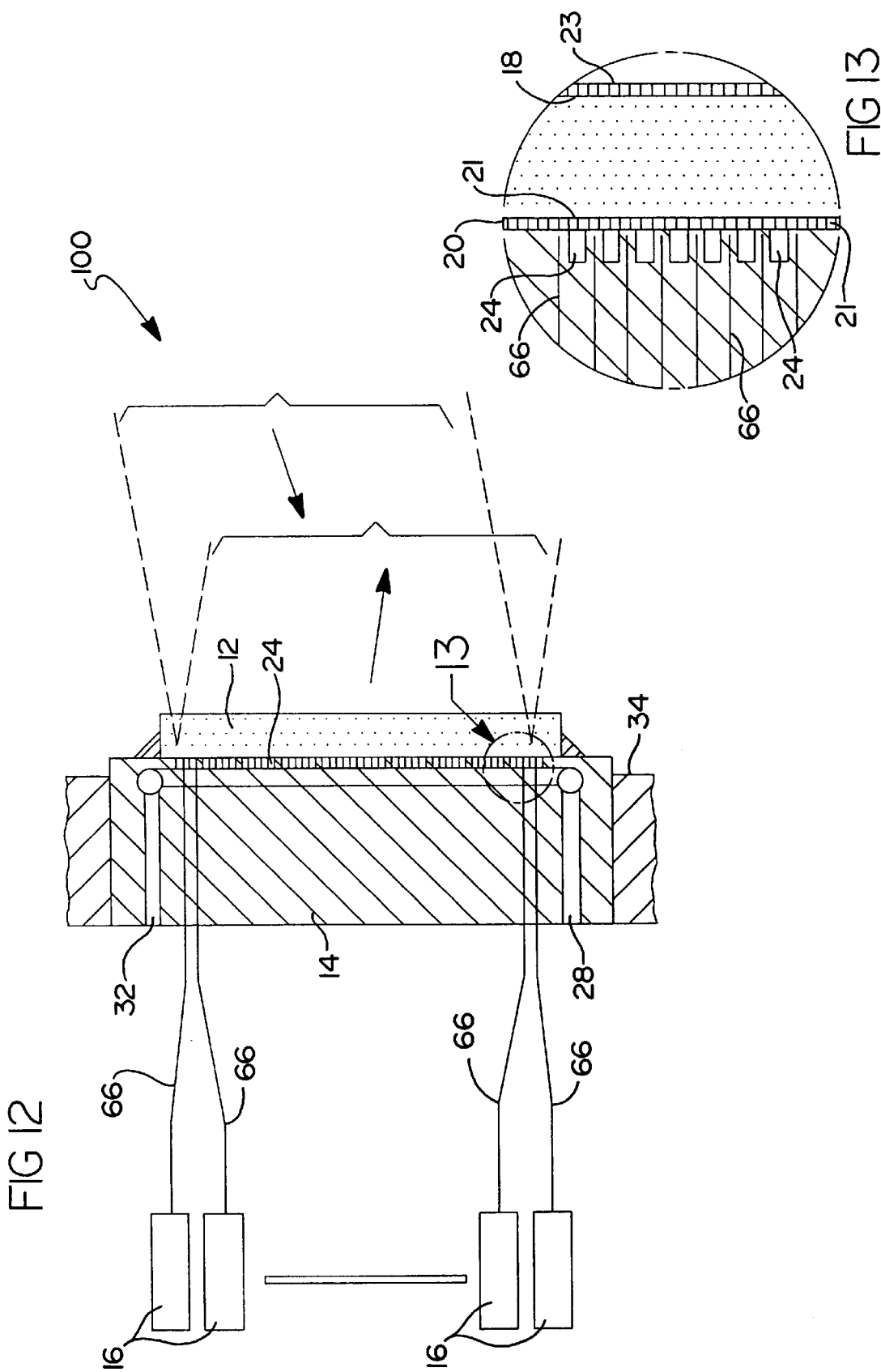

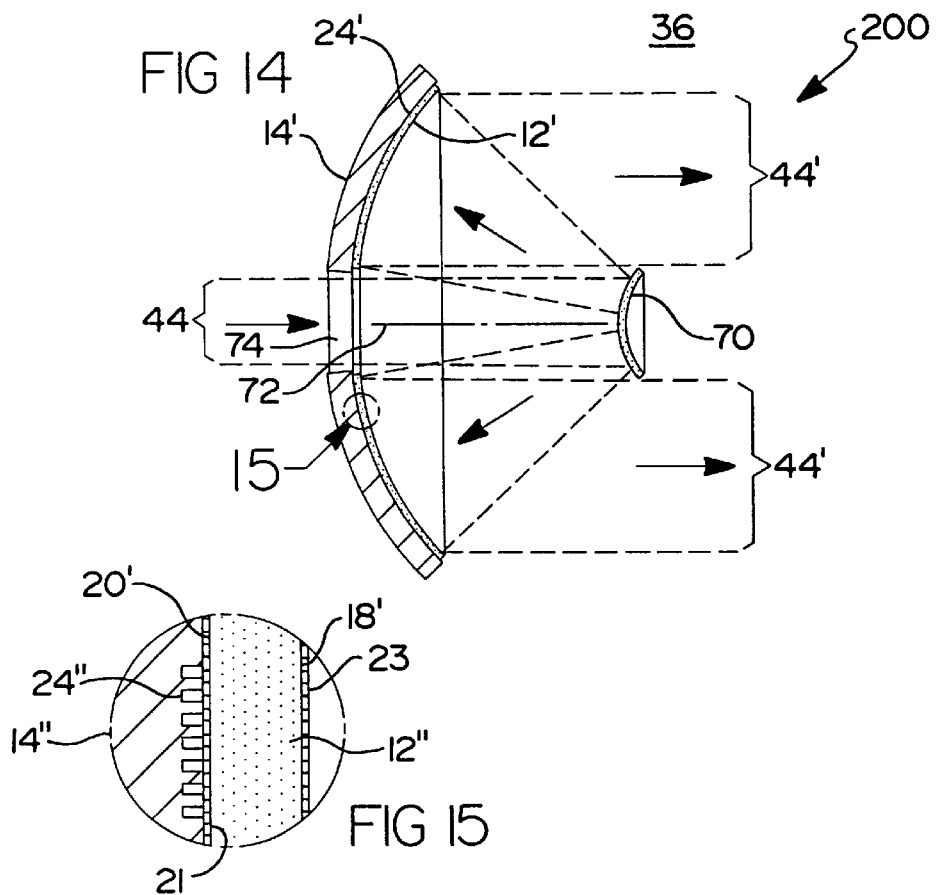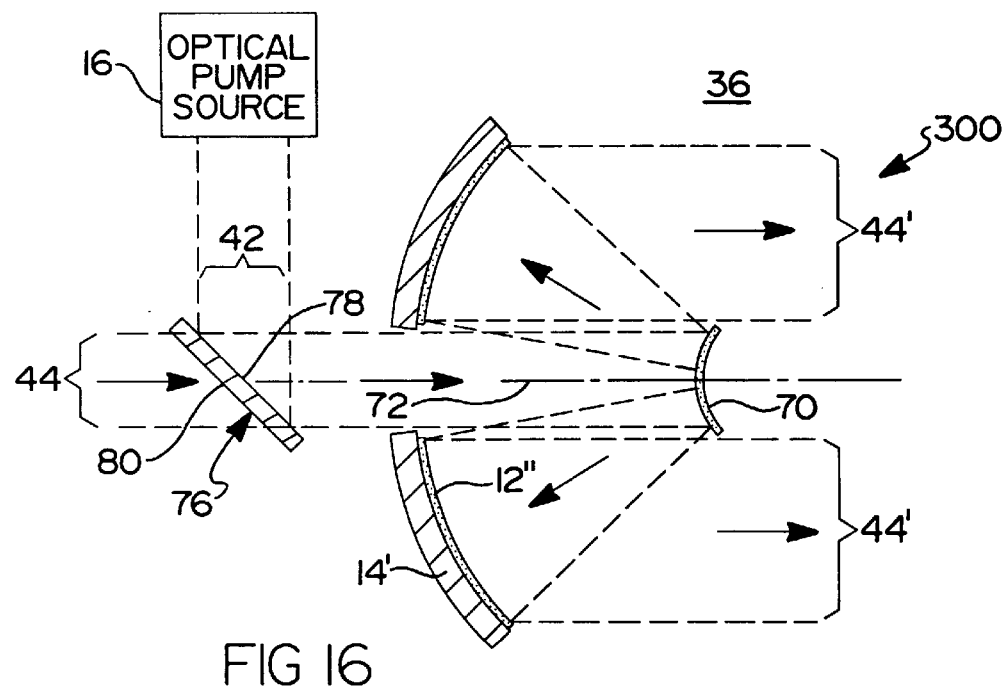

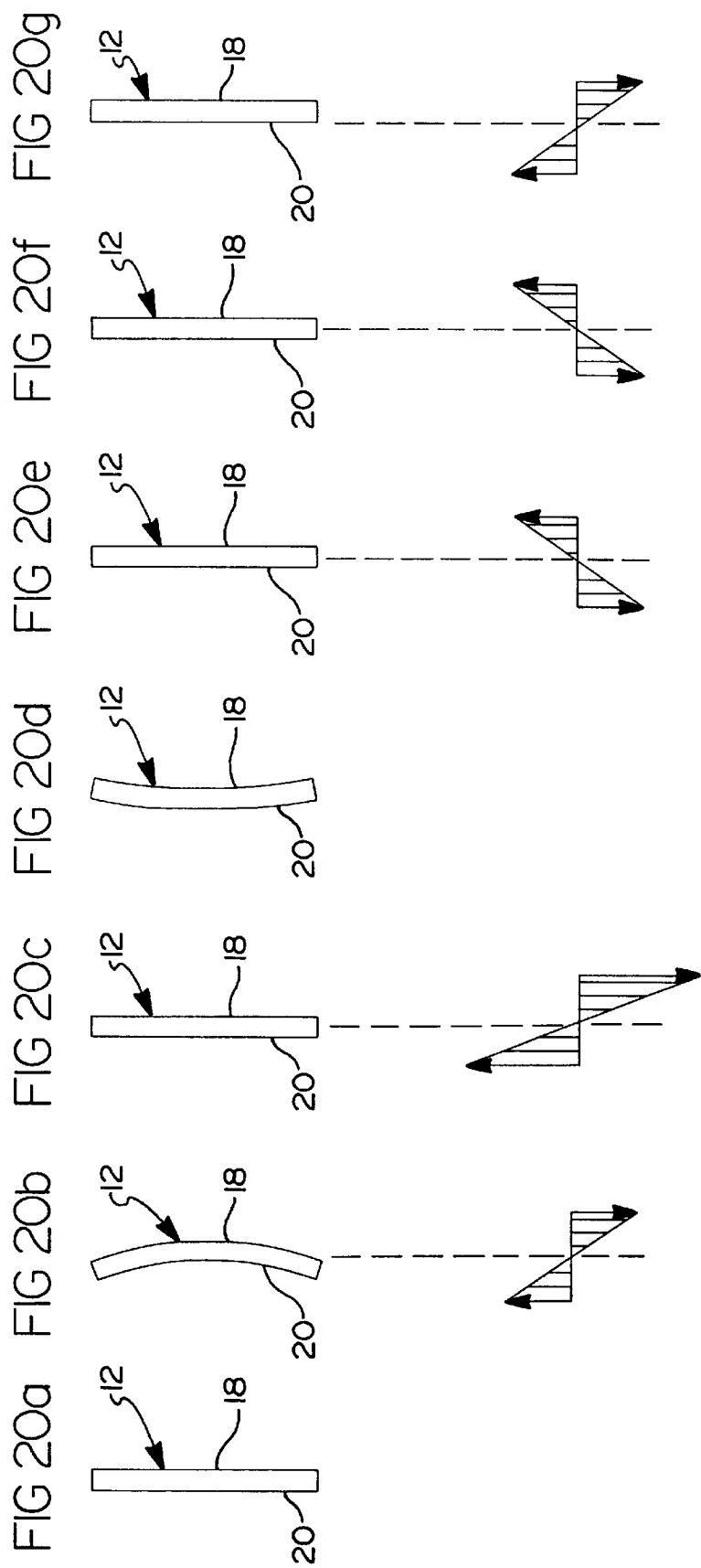

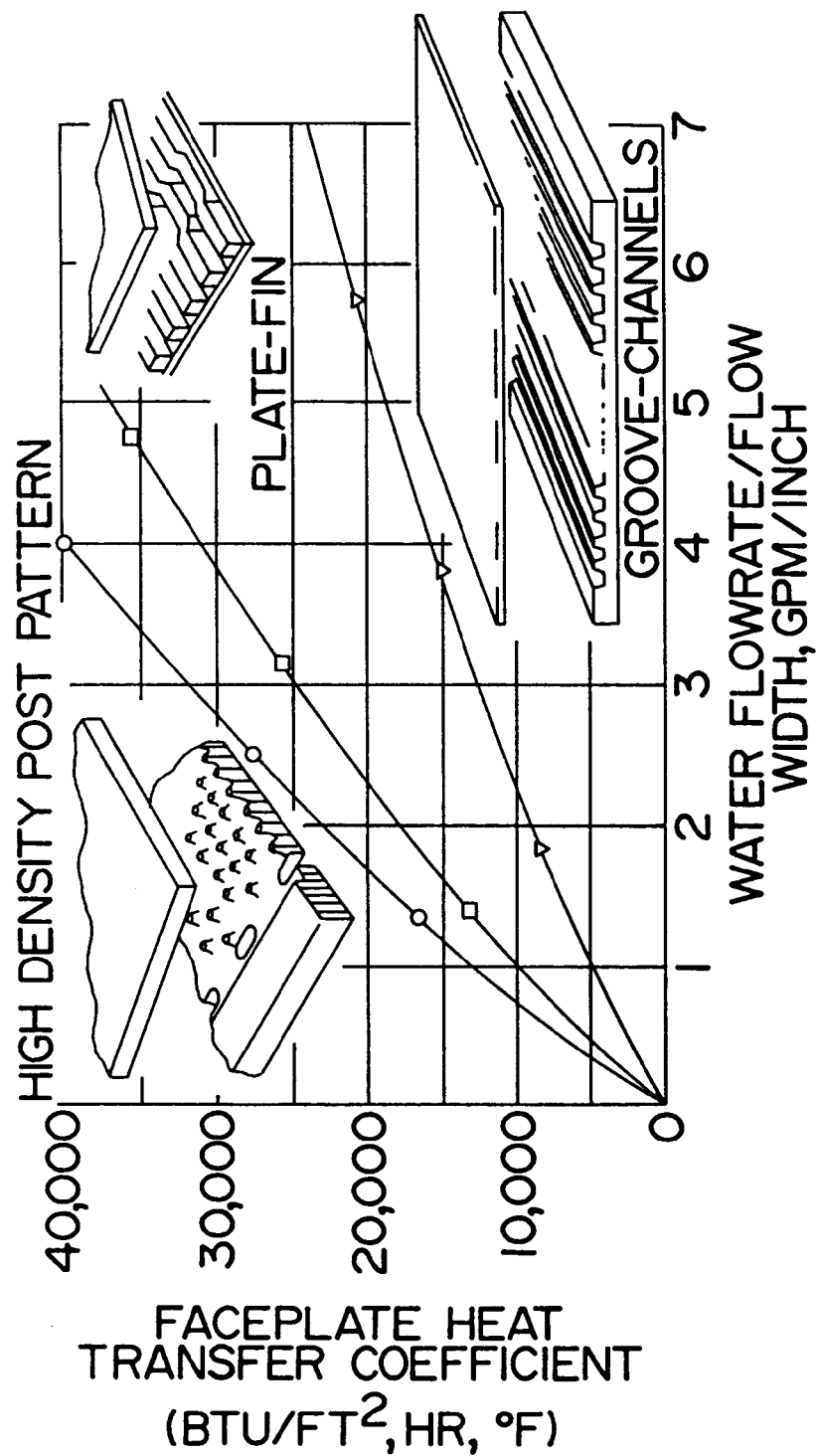

ACTIVE MIRROR AMPLIFIER SYSTEM AND METHOD FOR A HIGH-AVERAGE POWER LASER SYSTEM

TECHNICAL FIELD

This invention relates to solid-state lasers, and more particularly to an active mirror amplifier (AMA) laser having a generally thin laser gain medium attached by a pressure differential to a rigid substrate cooled by a flow of cooling medium through microchannels incorporated therein, thus enabling a construction of a laser capable of producing high-average power with good beam quality.

BACKGROUND OF THE INVENTION

High-power solid-state lasers are finding increasingly important applications in defense and commercial applications. The most recent growth in solid-state laser business can be attributed to the introduction of diode pumping. Advantages of solid-state lasers are all-electric operation, wavelength suitable for transmission through optical fibers, continuous duty capability, high wall-plug efficiency, and the possibility of engineering a high-power device into a small, lightweight package. For these reasons the commercial market for high-power (i.e., greater than 200 watts) solid-state lasers has grown steadily for the last decade. Potential military applications have also become more important in recent years. Most applications of high-power solid-state lasers require good beam quality. Beam quality ("BQ") is a measure of how well the laser beam can be focused to a spot. BQ is critically important in laser weapons where concentrated optical energy is required to thermally damage a specific target (e.g., a missile in flight). Other military applications also require good BQ for certain types of laser illuminators and other imaging-related uses. Similarly, laser beams with good BQ are required for industrial applications to produce high quality, deep penetration welds and precision cuts at increased speeds. Furthermore, availability of a low-cost, high-power solid-state laser with good BQ would open the door to extensive new applications, such as welding of aluminum in manufacture of light-weight automotive bodies, and cutting and drilling of aluminum and titanium in the production of aircraft.

Present day solid-state lasers extract coherent light from an inverted population of neodymium, ytterbium, or other suitable ions doped into crystals or glass. Population inversion is achieved by optically exciting dopant ions by absorption of optical radiation at wavelengths shorter than the laser wavelength. This process is commonly referred to as "pumping." Depending on the excitation source and the laser ions used, much of the optical pump radiation is converted into heat and deposited into the solid-state laser medium. Thus, for continuous operation, waste heat must be removed in real time by cooling selected surfaces of the laser medium. Because solid-state laser media are dielectrics that typically have a low thermal conductivity, a significant thermal gradient is created between the hot interior and the cooled outer surfaces. This causes a change in the index of refraction (thermal lensing), thermal expansion and mechanical stress in the medium, medium depolarization, detuning, and other undesirable effects, with possible consequences of BQ degradation, reduced laser power, and possibly even fracture of the solid-state medium. In particular, optical distortions caused by temperature gradients transverse with respect to the laser beam optical axis are known to reduce BQ.

Consequently, efficient heat removal and reduction of thermal effects caused by temperature gradients across the active area of the laser medium usually dominate design considerations for high-average power continuous wave (CW) solid-state lasers. Recently introduced pumping by narrow band radiation from laser diodes matched to absorption lines of dopant ions greatly reduces the amount of waste heat dissipated in the laser medium. Nevertheless, major heat-related problems in existing solid-state lasers are limiting their operation at high-average power and good beam quality.

With prior art solid-state, high-power lasers, several techniques have been introduced to reduce temperature gradients and/or mitigate their effects on laser operation. Chernoch, in U.S. Pat. No. 4,233,567 (1980), discloses a laser medium configured as a slab cooled on large flat sides and with the laser beam traversing the slab in zigzag fashion, as shown in FIGS. 1a–1c. In this concept, thermal gradients in the transverse direction parallel to the large flat sides of the solid-state medium are essentially eliminated and the gradient in the other transverse direction is reduced. Furthermore, the zigzag path of the laser beam through the slab generally averages out local thermal gradients. However, despite the inherent advantages (at least on a conceptual level) of a zigzag slab to mitigate thermal problems and nearly 20 years of engineering development, the acceptance of this type of system has been slow. The reasons for this include low efficiency, residual distortion (especially near the slab ends) which limit BQ, high cost of fabrication, and power scaling limitations.

Another class of solid-state laser amplifiers known as "active mirror amplifier" (AMA) has been investigated in the prior art. Originally disclosed by Chernoch in U.S. Pat. No. 3,525,053 (1970), large-scale laser systems employing AMA technology have been constructed for inertial fusion research. See for example, J. A. Abate et al., *Active Mirror: A Large-Aperture Medium-Repetition rate Nd:Glass Amplifier*, Applied Optics, volume 20, no. 2, pages 351–361, (1981). In the AMA concept, a single large aspect ratio, free-suspended disk is optically pumped and cooled from the back side, and the laser radiation to be amplified enters from the front, as shown in FIG. 2. The front face of the disk has an anti-reflection coating for the laser radiation, whereas the backside has a dichroic coating, which is highly reflective for the laser radiation and transparent to the pump radiation. Flashlamp pumping is commonly used with the AMA. Advantages of the AMA are:

- The pump radiation source can be closely coupled to the laser gain medium;
- The laser gain medium is uniformly pumped across the gain profile;
- Surfaces receiving the highest heat deposition are cooled by direct contact with flowing liquid;
- Double pass configuration compensates for thermally induced birefringence; and
- Suitability for circularly polarized beams.

Lasers using AMA were mainly single shot (low-average power) systems (such as used in inertial confinement fusion research) where real-time heat removal was not required. Prior art lasers using AMA are entirely unsuitable for high-average power operation, however, because of several reasons. For one, to ensure structural rigidity, the solid-state disk must be made relatively thick (i.e., several centimeters), which impedes heat extraction. Another reason is that one sided heating of the free-suspended disk causes mechanical distortion resulting in a wavefront error. Yet another reason is that coolant pressure must be low to avoid distortion of the disk, resulting in low flow rates and low heat transfer coefficients. Still further, coolant flow induces vibrations in the disk. Previous attempts to mitigate these problems and increase the average power output of a laser using an AMA have been met with encouraging but limited results.

In recent years, the AMA concept has been revived in the form of a Thin Disk Amplifier (TDA) introduced by Brauch et al in U.S. Pat. No. 5,553,088. The TDA offers significant improvement over prior art lasers using an AMA as it allows operation at significantly higher average power (several hundred watts) and with good BQ. See, for example, H. Hugel and W. L. Bohn, *Solid State Thin Disk Laser*, SPIE Proceedings, volume 3574, pages 15–28, (1998). The TDA, as shown in FIG. 3, consists of a thin disk (i.e., a crystal) of suitable solid-state laser medium (e.g., Nd:YAG, Yb:YAG) attached to a heat sink by a thermally conductive bond. The rear face of the disk has an optical coating exhibiting very high reflection at the laser wavelength and the pump radiation wavelengths, whereas the front face has a coating with antireflection characteristics at laser and pump radiation wavelengths. Unlike the traditional AMA approach, optical pump radiation is injected into the disk through the front face. Heat generated within the disk is conducted to the rear face and transported into the heat sink through the thermally conductive bond (typically an indium foil).

While the TDA configuration is generally effective in avoiding excessive transverse temperature gradients, it is not scalable to high-average powers (i.e., much greater than several hundred watts). The problem is both thermal and mechanical. With increasing pump power, the disk temperature rises. Although the bond is made of thermally conductive and mechanically compliant material (typically indium), thermal expansion of the disk introduces significant thermal stresses in both the bond and the laser gain medium. Besides distorting the laser gain medium (i.e., thus degrading the laser BQ), such stresses would eventually either damage the bond or fracture the disk. As a result, laser operation at high power density and high BQ is compromised. The problem becomes more severe with increased diameter of the disk. Thus, the total power output from a single disk is limited. In particular, thermo-mechanical considerations have limited the size of the TDA disk to less than 1 cm in diameter and less than 1 mm in thickness.

Furthermore, introducing pump radiation to the front face of the TDA requires optical elements which may interfere with laser beam propagation and laser beam optics. The problem is made more severe if multiple re-injection of the pump radiation is required to compensate for the low absorption of pump power in a disk that is several hundred micrometers thick, as illustrated in FIG. 4. As a result, the laser system is more difficult to package and align. Introducing pump radiation via optical fibers attached to the circumference of the disk is one alternative described by Brauch et al., but this is cumbersome and impedes tight packaging of laser components. In summary, the prior art TDA has the following limitations:

disk diameter (and thus laser power) are limited by thermal stresses to less than about 10 millimeters;

Indium bond is relatively weak and susceptible to failure at high thermal stresses conductivity variations of the bond joint cause "hot spots" in the laser gain medium;

high temperature gradients together with the semi-rigid bond joint cause thermal stresses, which limits pump and laser power, beam quality, and the size of the disk;

limited power output with good beam quality (typically less than 200 watts); and pump power delivery means are not suitable for tight packaging and easy alignment.

Another approach to handle thermal load problems in a solid state laser gain medium uses the heat capacity (i.e., thermal inertia) of the gain medium to temporarily store dissipated heat. Such a concept, also known as the "heat capacity laser", (HCL) has been disclosed by Albrecht et al. in U.S. Pat. No. 5,526,372. HCL uses one or more free suspended disks or slabs of solid state laser gain medium approximately 1 cm thick with the large faces generally normal (including a Brewster angle) incidence with respect to the amplified laser beam. Prior to laser operation, the laser gain medium is cooled by a flow of gas to initial operating temperature. During laser operation, the laser gain medium gradually warms up until it reaches its final operating temperature. At that point the laser operation is suspended and the laser gain medium is allowed to cool again to its initial operating temperature. After reaching this temperature, the process can be repeated. In this fashion, the HCL can be operated in a semi-continuous fashion. The length of the laser cycle depends on the amount of the laser gain medium and its thermal storage capacity, while the length of the cooling cycle depends on the effectiveness of the gas cooling applied to the large faces of the laser gain medium.

SUMMARY OF THE INVENTION

In preferred embodiments the present invention is directed to a laser module having one or more active mirror amplifiers (AMA) which is capable of operating at high-average power and providing near diffraction limited beam quality (BQ). In particular, the preferred embodiments of the present invention provide numerous advantages over prior art AMA designs, including:

AMA with laser diode pump means that reduces the waste heat load to the solid-state laser medium;

a relatively thin solid-state medium to allow efficient conduction of waste heat;

microchannel cooling means for efficient removal of waste heat;

a substrate which provides rigid mechanical support for the solid-state laser medium; optionally, the substrate being transparent to pump radiation;

pressure means to maintain the solid-state gain medium attached and conformed to the substrate;

attachment means that reduce thermally induced stresses in the solid-state gain medium; and a pre-formed, solid-state laser gain medium that suffers reduced thermally induced stresses during operation.

In one preferred embodiment, the AMA comprises a rigid substrate having a plurality of microchannel passages formed therein and opening to an outer surface. A laser gain medium is disposed against the outer surface and held against it by a pressure differential existing between the atmosphere in which the laser module is disposed and the pressure in the microchannel passages. Such pressure differential depends on the operating conditions but is typically several tens of pounds per square inch (PSI). The dimensions of the microchannels formed at the outer surface of the substrate may vary considerably, but in one preferred form these microchannels have a width of between about 0.005 inch to 0.040 inch and cross-sectional area of between about 0.0000025 to 0.0015 square inch (0.00016125 to 0.01032 square cm).

Furthermore, the rigid substrate contains a heat exchanger suitable for circulating liquid cooling medium. Heat generated in the laser gain medium is conducted into the substrate and transferred into the cooling medium. In this manner, heat that is generated in the laser gain medium is efficiently dissipated in real time during the use of the laser module without significantly affecting the beam quality of the produced laser beam.

In another preferred embodiment, the liquid cooling medium is allowed to flow through the microchannels and directly wet the surface of the laser gain medium to obtain an enhanced cooling effect. The laser gain medium remains attached and conforming to the substrate since the cooling medium is maintained at a pressure much lower than the pressure of the atmosphere in which the laser module is immersed.

In another preferred embodiment, the rigid substrate is fabricated of material optically transparent to the pump radiation and the pump radiation is delivered to the laser gain medium through the substrate. In this case, a cooling medium transparent to the pump radiation is used.

In yet another alternative preferred embodiment, the substrate is formed by a multi-piece assembly comprising a rigid backing plate having a plurality of headers for communicating a cooling medium therethrough. A manifold plate has a first surface thereof disposed against one surface of the backing plate, and a heat exchanger plate is disposed against a second surface of the manifold plate. The manifold plate and the heat exchanger plate each include flow passages for allowing the cooling medium to be communicated ultimately to the heat exchanger plate where it is used to cool a laser disk medium disposed against a surface of the heat exchanger plate.

Additional preferred embodiments of the present invention incorporate laser gain media which is preformed with a predetermined curvature while in an "unconstrained" condition before being secured to a substrate. During operation, as one surface of the laser gain medium heats up, the opposite surface cools down, and the tensile and compressive stresses experienced on the opposite sides of the medium are relieved as the medium reaches an operating temperature.

The use of optical fibers and hollow ducts for transmitting the optical radiation from one or more optical pump sources into the laser gain medium is also disclosed.

The various preferred embodiments of the laser module of the present invention enable a solid state, high-powered laser to be constructed which has excellent beam quality. Power scaling to tens and possibly hundreds of killowatts is realizable because of the significantly increased cooling of the laser module. This cooling allows the laser module to operate at significantly increased power without overheating. The attachment of the laser medium to the substrate using the pressure differential between the coolant and the surface of the disk further eliminates the attachment-induced thermal stresses of prior art designs and allows the laser module of the present invention to operate at significantly increased power without fracturing the laser gain medium. The invention can also be used as a building block for construction of a laser oscillator or laser amplifier.

BRIEF DESCRIPTION OF THE DRAWINGS

The various advantages of the present invention will become apparent to one skilled in the art by reading the following specification and subjoined claims and by referencing the following drawings in which:

FIG. 9 is a side cross sectional view of an alternative preferred embodiment of the present invention;

FIG. 10 is an enlarged view of portion 10 of the module of FIG. 9;

FIG. 12 is a simplified schematic drawing of the delivery of pump power by optical fibers to the laser gain medium;

FIG. 13 is a view of an enlarged portion 13 of the module of FIG. 12;

FIG. 14 is a view of a laser module of the present invention wherein the laser gain medium disk is configured as an annular section of a spherical shell;

FIG. 15 is an enlarged view of portion 15 in FIG. 14;

FIG. 16 is a view of laser module of FIG. 14 being used to form an amplifier module using an active mirror assembly;

FIG. 20a is a side view of a laser medium disk in an unconstrained condition prior to reaching an operating temperature;

FIG. 20b is a view of the laser medium disk of FIG. 20a in an unconstrained condition which it would otherwise assume when reaching an operating temperature, and illustrating the tensile and compressive stresses on the disk when it is unconstrained and at an operating temperature;

FIG. 20c is a view of the laser medium disk of FIG. 20b constrained to a flat condition while at an operating temperature, illustrating the increased tensile and compressive forces;

FIG. 20d is a side view of a pre-formed, unconstrained laser medium disk prior to being heated;

FIG. 20e is a view of the pre-formed laser medium disk of FIG. 20d after same has been heated, and illustrating the magnitudes of the tensile and compressive forces it experiences;

FIG. 20f is a side view of a laser medium disk in a constrained condition prior to being heated, and illustrating the tensile and compressive forces experienced by the disk;

FIG. 20g is a side view of the laser medium disk in a constrained orientation after being heated, and illustrating the reduction and reversal of tensile and compressive forces experienced by the disk when constrained at an operating temperature; and FIG. 21 is a graph of the heat transfer coefficient realized with the microchannel cooling provided by the preferred embodiments of the present invention;

DETAILED DESCRIPTION OF THE PREFERRED EMBODIMENTS

Figure 1A:
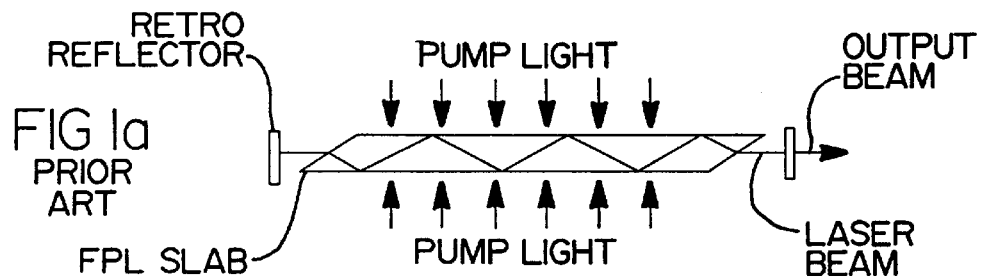
FIGS. 1a–1c illustrate a prior art zigzag slab laser.
Figure 1B:
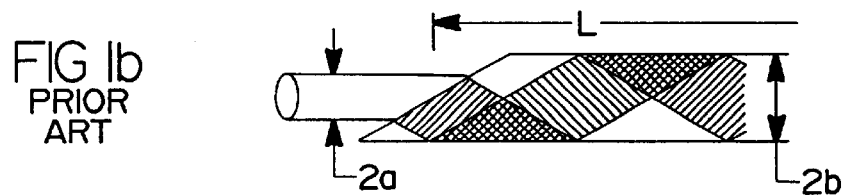
Figure 1C:
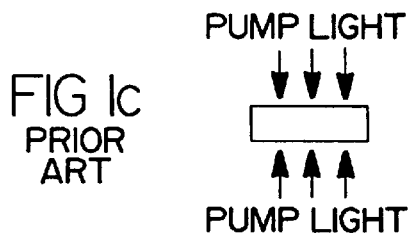
Figure 2:
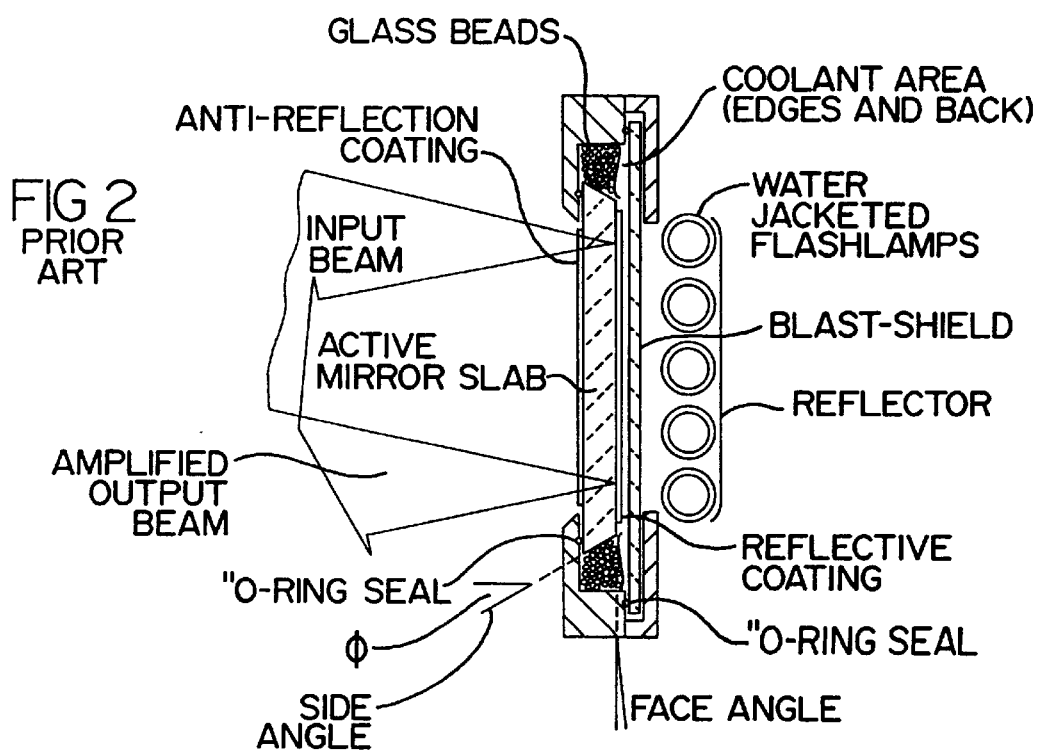
FIG. 2 is a view of a prior art active mirror amplifier (AMA) for a low average power laser.
Figure 3:
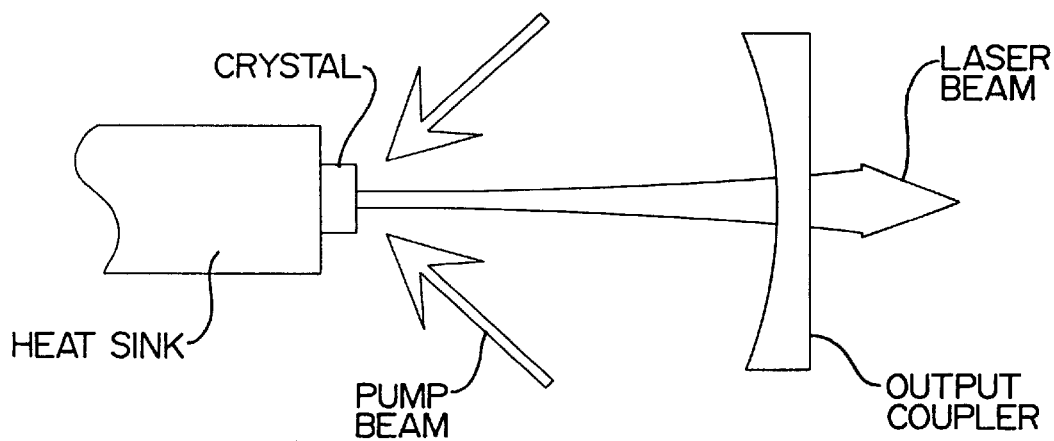
FIG. 3 is a diagram of a prior art thin disk laser (TDL) configuration.
Figure 4:
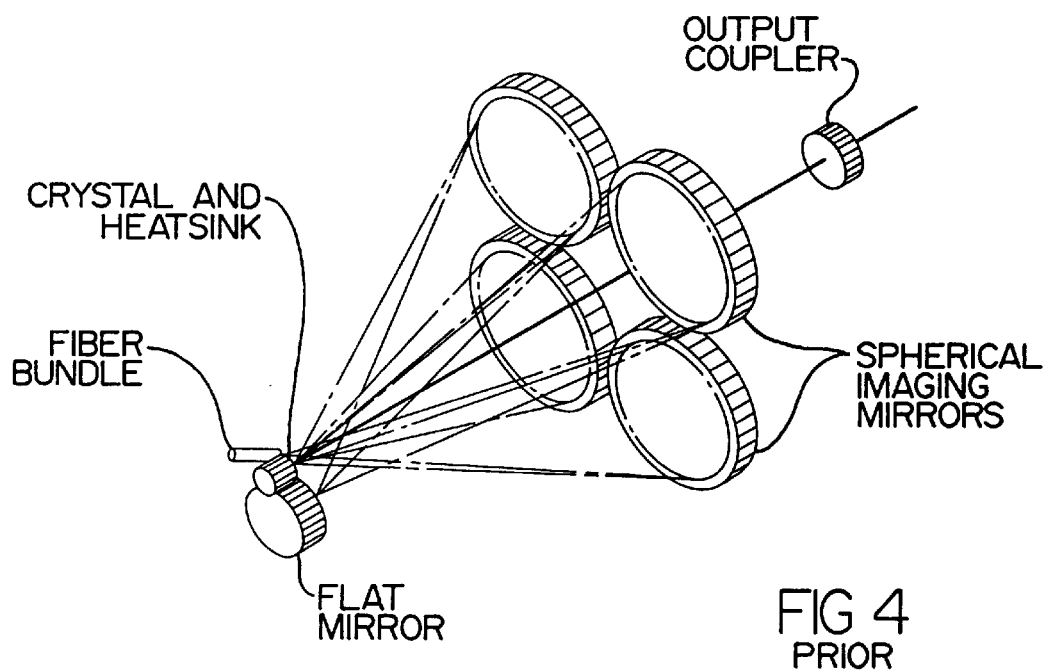
FIG. 4 is a simplified perspective view of a prior art mirror train for delivery of pump power for the TDL.
Figure 5:
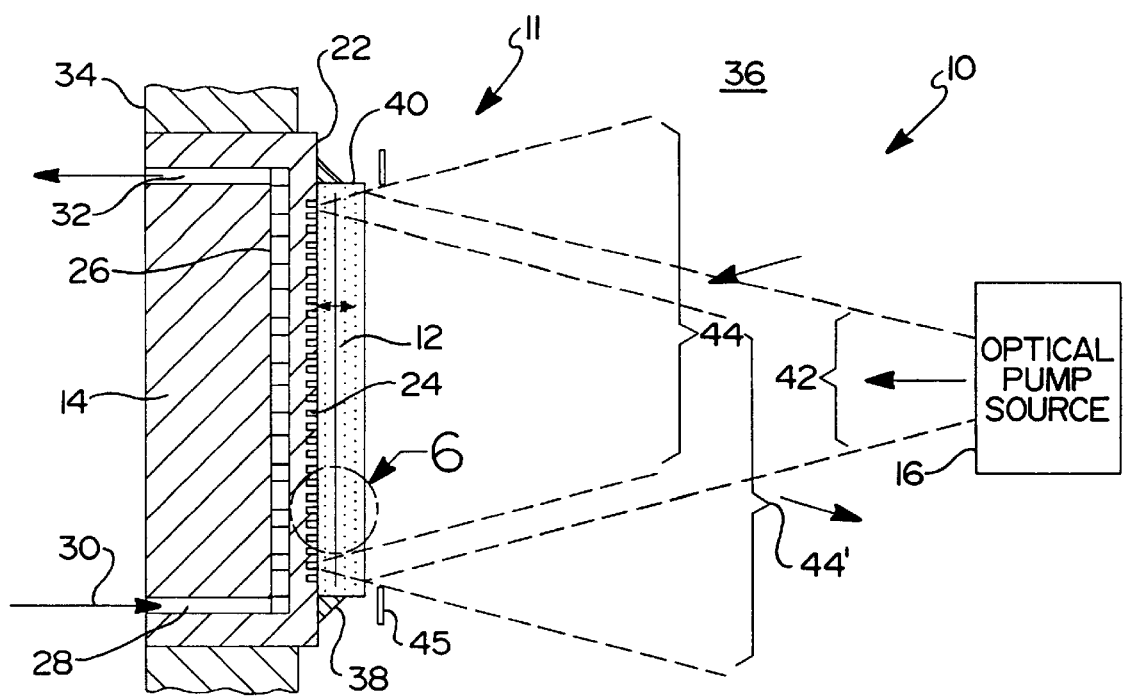
FIG. 5 is a side cross sectional view of an active mirror amplifier (AMA) forming a laser module in accordance with a preferred embodiment of the present invention.
Figure 6:
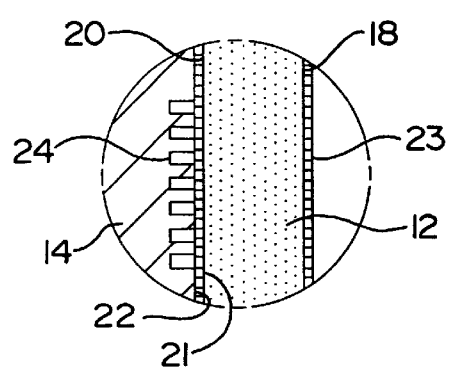
FIG. 6 is an enlarged view of portion 6 of the laser module of FIG. 5.

Referring to FIGS. 5 and 6, there is shown a preferred embodiment of a solid-state laser amplifier module 10 in accordance with the present invention. The module 10 generally comprises an active mirror assembly 11 and an optical pump source 16. The active mirror assembly 11 contains a solid-state laser gain medium 12 having two planar, mutually parallel surfaces, a front surface 18 and a back surface 20, ground to optical flatness. The shape of the laser gain medium 12 may vary widely but in one preferred form comprises a circular disk with a diameter "D" several times greater than its thickness "T". The laser gain medium could just as readily be formed in other various shapes such as (but not limited to) rectangular, square or elliptical shapes if desired. Furthermore, while the use of the term "disk" is used herein to reference this component, it will be appreciated that the laser gain medium 12 may take other forms which might not be viewed, strictly speaking, as a "disk".

Typically, the laser gain medium disk 12 may have a thickness ranging approximately from 1 mm to 10 mm and transverse dimensions ranging from about 10 mm to 300 mm. The material of the laser gain medium disk 12 comprises a suitable solid-state laser gain medium such as, but not limited to neodymum doped yttrium aluminum garnet (Nd:YAG), yitterbium doped yttrium aluminum garnet (Yb:YAG), neodymum chromium codoped gadolinium gallium garnet (Nd:Cr:GGG or "GGG" for short), or neodymum doped glass (Nd:Glass).

Referring further to FIGS. 5 and 6, the back planar surface 20 has a dielectric optical coating 21 with high reflectivity at a laser wavelength and at optical pump wavelengths. The front surface 18 has a dielectric optical coating 23 that is antireflective at the laser wavelength and at the optical pump wavelength. The back surface 20 is in contact with a surface 22 of a cooled, rigid substrate 14. The surface 22 contains an array of interconnected vacuum microchannels 24 extending generally over, but not beyond, the contact area between the disk 12 and the substrate 14.

The substrate 14 contains a heat exchanger 26 (FIG. 5) which is located below the surface 22 and not connected to the vacuum microchannels 24. Coolant 30 is provided to the heat exchanger 26 by an inlet header 28 and drained therefrom by the outlet header 32. Internal distribution of the coolant 30 inside the heat exchanger 26 is such so as to provide a uniform cooling effect over a large part of the back surface 20 of the laser gain medium disk 12. Suitable coolants may include liquids such as deionized water, alcohol, members from the Freon® family, and liquid nitrogen.

The cooled substrate 14 is made of a material with good thermal conductivity, preferably copper, but other materials with good thermal conductivity and suitable for microchannel fabrication can be used. The material of the substrate 14 can also be chosen to have a coefficient of thermal expansion close to that of the laser gain medium disk 12. Surface 22 of substrate 14 is machined to optical flatness except for penetrations created by the microchannels 24. Typical dimensions for the microchannels include a width of about 0.005 to 0.040 inch and a cross sectional area of about 0.000025 inch$^2$–0.0016 inch$^2$ (0.00016125 cm$^2$–0.0103 cm$^2$). Microchannels 24 preferably occupy about 50% of the contact area between surface 22 of substrate 14 and back surface 20 of laser gain medium disk 12. The microchannels 24 may also be formed in a variety of cross-sectional shapes, but preferably have a generally square cross-sectional shape. The thickness of the substrate 14 is chosen to provide mechanical rigidity necessary to ensure that the surface 22 remains optically flat under operational conditions.

Positive contact between the back surface 20 of laser gain medium disk 12 and surface 22 of the substrate 14 is maintained by a pressure differential between the higher pressure of the atmosphere 36 surrounding the mirror assembly 11 and the lower pressure inside the microchannels 24. The microchannels 24 are maintained at low pressure, and preferably maintained at low pressure by a vacuum pump. The required pressure differential to so maintain the surfaces 20 and 22 is typically several tens of PSI. Such a continuous contact ensures that the back surface 20 will remain optically flat even when laser gain medium disk 12 experiences significant thermal load. The continuous contact between surface 20 and surface 22 further facilitates the conductive transfer of heat from the laser gain medium disk 12 to substrate 14. The substrate 14 may be further installed into an optical mount 34 to facilitate easy positioning and alignment. Apart from the contact between the optically flat surfaces 20 and 22, which in itself provides a good seal, the atmosphere 36 can be further sealed from the microchannels 24 by an elastomeric bond 38 between the perimeter surface 40 of laser gain medium disk 12 and the surface 22. Bond 38 also holds the laser gain medium disk 12 to the substrate 14 in the absence of a pressure differential, such as during non-lasing conditions. Using a compliant seal in this area also avoids restraining of the disk 12 from thermal expansion during lasing and reduces thermal stresses therein. Suitable materials for the elastomeric bond 38 include RTV® silicon rubber. Other forms of compliant seals such as an O-ring may also be used. Thermal damage to the bond 38 potentially caused by a misalignment of optical pump radiation 42 and/or incident laser beam 44 is prevented by a collimator 45 which either absorbs and/or reflects optical radiation incident on the edge of the laser gain medium disk 12.

During lasing, optical pump source 16, which preferably comprises an array of laser diodes, produces and directs collimated optical pump radiation 42 into the front surface 18 of the laser gain medium disk 12. During passage through the laser gain medium disk 12 the optical pump radiation 42 is gradually absorbed. This absorption process follows Beer's law: $I(x)=I_0 \exp(-ax)$, where "x" is the distance into absorbing medium, "a" is the absorption coefficient, "$I_0$" is the initial intensity of pump radiation, and "I(x)" is pump radiation intensity after traveling distance "x" in the absorbing medium. The fraction of pump radiation 42 not absorbed after the first pass through the laser gain medium disk 12 is reflected from the dielectric coating 21 and makes a second pass through the laser gain medium disk 12, this time in a generally reverse direction. Preferably, the material of laser gain medium disk 12 is doped with absorbing species so that 90% or more of incident pump radiation 42 is absorbed in two passes through the disk 12.

Optical radiation 42 absorbed by dopant species in laser gain medium disk 12 pumps the dopant species to a laser transition. This allows the laser gain medium disk 12 to serve as an amplifier of coherent optical radiation. The incident laser be am 44, having approximately the same footprint as the transverse shape of the laser gain medium disk 12, is directed into the laser gain medium 12 at a generally normal incidence through front surface 18 and is amplified until it reaches the dielectric coating 21. On reflection from coating 21, the laser beam passes through the laser gain medium 12 again in a generally reverse direction. The amplified laser beam 44' exits the disk 12 in a direction generally normal to the front surface 18. Heat dissipated in the laser gain medium disk 12 is conducted to back surface 20 and through the dielectric coating 21, and transferred to surface 22 of the substrate 14 from which it is conducted to the heat exchanger 26.

Figure 7:
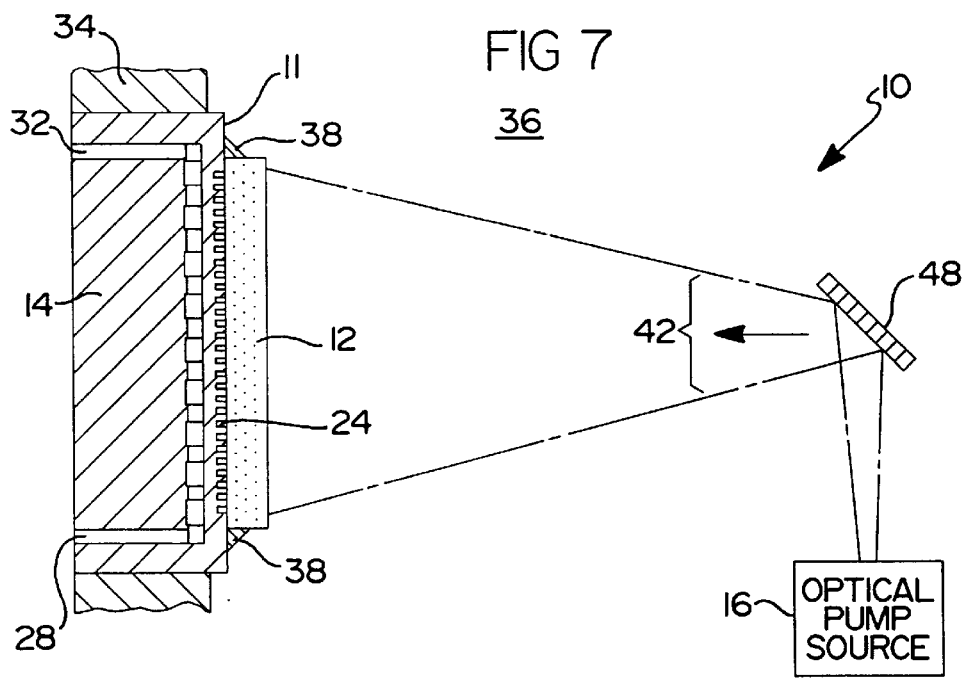
FIG. 7 is a simplified view of a laser module of the present invention wherein optical radiation is transmitted thereto via a reflective or refractive means.
Figure 8:
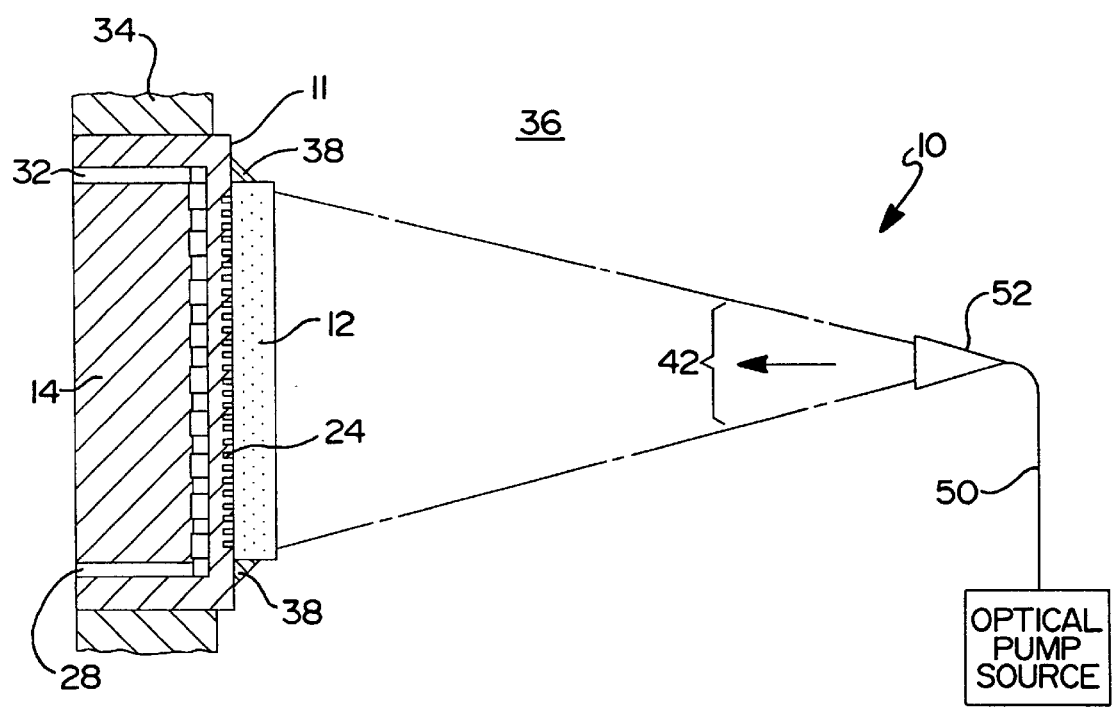
FIG. 8 is a view of the laser module of FIG. 7 wherein optical radiation is transmitted thereto using an optical fiber and expansion optics.

The optical radiation source 16 preferably comprises one or more laser diodes or an array of laser diodes. Optical radiation source 16 may irradiate the laser gain medium disk 12 directly as shown in FIG. 5. Alternately, the optical radiation 42 can be transported to the front surface 18 of laser gain medium disk 12 through a series of reflective or refractive means. An example of such a system is shown in FIG. 7 where the output of optical radiation source 16 is directed onto a reflector 48 from which it is reflected into the laser gain medium disk 12. Still another variant for delivering pump radiation 42 into the laser gain medium disk 12 employs an optical fiber 50 and expansion optics 52 as shown in FIG. 8. Yet another variant of the invention may use a hollow duct instead of an optical fiber for delivery of pump radiation to the laser gain medium.

An alternate variant of the invention (not shown in the Figures) provides pump radiation 42 to the perimeter surface 40 of the disk 12 (in FIG. 5) and allows it to propagate in the disk in a direction generally parallel to surfaces 18 and 20 until it is largely absorbed.

An alternative preferred embodiment 100 of the solid-state laser amplifier module of the present invention suitable for operation at increased optical power density is shown in FIG. 9, and comprises an active mirror assembly 54 and optical pump source 16. The active mirror assembly 54 contains the solid-state laser gain medium disk 12, which is generally the same as that described in connection with FIG. 5.

As illustrated in FIGS. 9 and 10, the back plannar surface 20 of disk 12 has a dielectric optical coating 21' with high reflectivity at laser wavelength and being antireflective at the pump wavelengths, and the front surface 18 has a dielectric optical coating 23' that is antireflective at the laser wavelength and has high reflectivity at the pump wavelengths. The surface 20 is in contact with a surface 22 of a rigid substrate 14'. The surface 22 contains an array of interconnected microchannels 24 of a generally same configuration as described in connection with FIG. 5 except that the coolant 30 is now allowed to directly wet the back side 20 of the disk 12 and the optical coating 21' thereon. In particular, the coolant 30 is provided to the microchannels 24 by the inlet header 28 and drained therefrom by the outlet header 32. In this fashion heat generated in disk 12 is conducted through the surface 20 and the optical coating 21' directly into the coolant 30. This approach provides a superior cooling effect over the configuration in FIG. 5 wherein heat must be conducted to the heat exchanger 26 located inside the substrate 14. A distribution manifold 47 provides internal distribution of the coolant 30 to the microchannels 24 so as to provide a uniform cooling effect over a large part of the back surface 20 of the laser gain medium disk 12.

The substrate 14' is made of a material optically transparent to the pump radiation 42. Preferred material is fused silica but other optical materials transparent to the pump radiation and suitable for microchannel fabrication can be used. The thickness of the substrate 14' is chosen to provide mechanical rigidity necessary to assure that the surface 22 remains optically flat under operational conditions. The substrate 14' can be fabricated by ultrasonic machining of the microchannels 24 and the concomitant distribution channels into several plates of glass, crystal or other suitable material, and diffusion bonding the plates into a single monolithic unit. Such a fabrication process is currently used by the assignee of the present invention to fabricate high-power, actively-cooled optics. Positive contact between the back surface 20 of the laser gain medium 12 and the surface 22 of the substrate 14' is maintained by a pressure differential between the higher pressure of the atmosphere 36 surrounding the mirror assembly 54 and the lower pressure of the coolant 30 inside the microchannels 24.

During lasing, optical pump source 16 produces and directs collimated optical pump radiation 42 into the back surface 82 of the substrate 14'. As the substrate 14' and the coolant 30 are optically transparent at the pump radiation wavelengths, the pump radiation 42 is transported through them and through the optical coating 21' into the disk 12. The fraction of the pump radiation 42 not absorbed on the first pass through the disk 12 is reflected from the coating 23' and makes a second pass through the disk, this time in a generally reverse direction.

Figure 11:
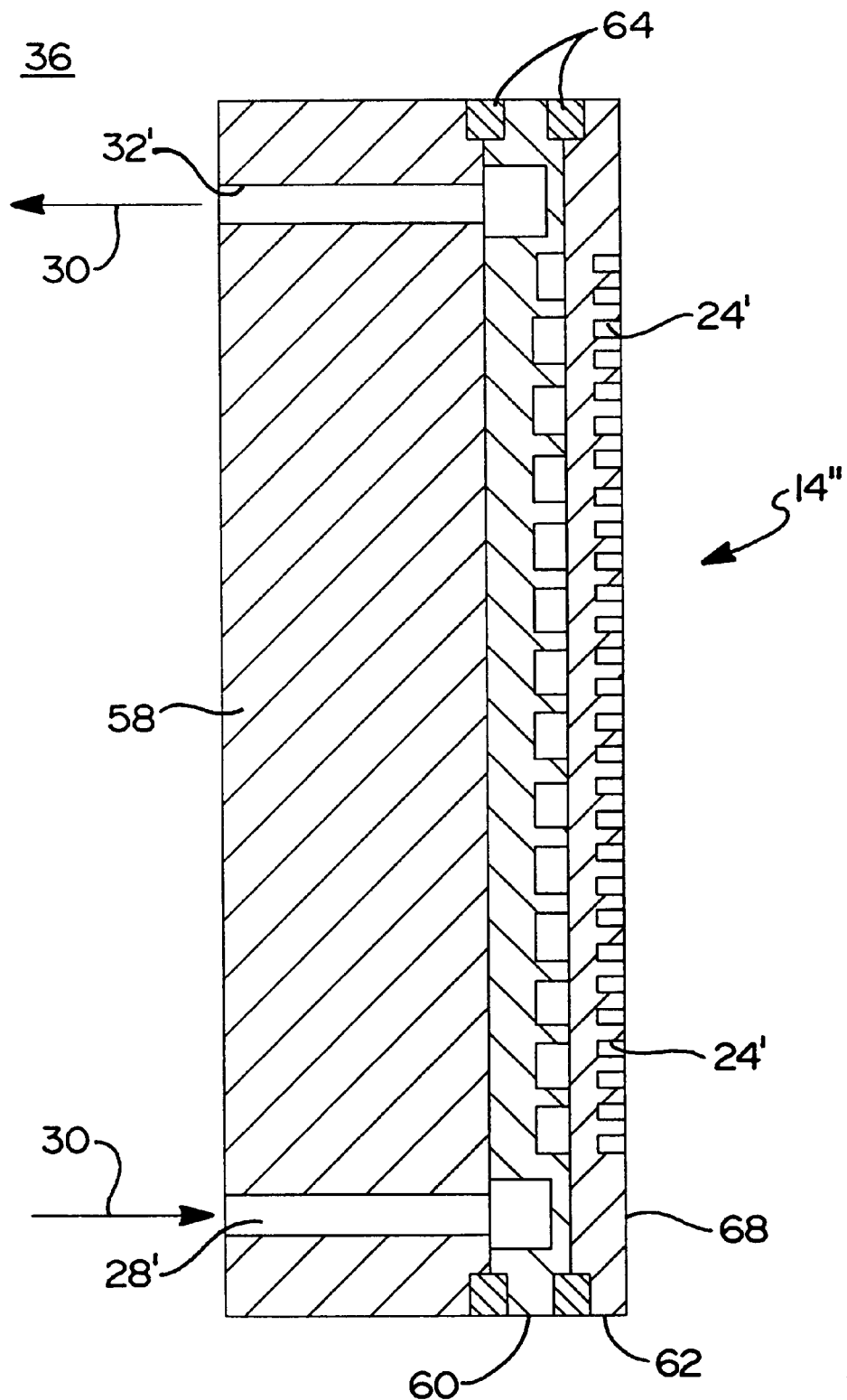
FIG. 11 is a view of an alternative preferred embodiment of the laser module substrate assembly comprising a stack of plates held together by a pressure differential.

An alternate construction of the substrate 14" shown in FIG. 11 employs a simple monolithic backing plate 58, a distribution manifold plate 60, and heat exchanger plate 62 interfacing the laser medium disk 12. The coolant 30 is fed into the backing plate 58 through inlet header 28', through the distribution plate 60 into the heat exchanger plate 62, through microchannels 24' wetting the back surface 20 of the laser gain disk 12, and eventually out through the outlet header 32'. The backing plate 58, distribution plate 60 and heat exchanger plate 62 are not bonded together, but rather kept in contact by a positive pressure differential between the atmosphere 36 and the coolant pressure. Large surfaces of the plates 58, 60 and 62 are ground flat and polished to achieve a seal between adjacent flow channels 24' therein. Seals 64 additionally function to isolate the atmosphere 36 from the coolant 30. This form of the substrate is substantially easier to fabricate than a diffusion-bonded substrate, and consequently also less expensive.

In some situations it may be advantageous to fabricate the substrate 14' (FIGS. 9 and 10) from material that is not transparent to pump radiation 42 and/or to use coolant 30 which exhibits significant absorption of the pump radiation. In such cases, optical pump radiation can be injected into the laser gain medium disk 12 used with active mirror assembly 54 through the front surface 18, providing that the coating 23' is made antireflective at the wavelengths of both the incident laser beam 44 and pump radiation 42, and the coating 21' is made reflective at the wavelengths of both the incident laser beam 44 and pump radiation 42. Suitable methods for illumination of the laser gain medium 12 by optical pump radiation 42 under these conditions are illustrated in FIGS. 5–8.

FIGS. 12 and 13 show yet another method for delivering pump radiation to the laser gain medium disk 12 of active mirror assembly 54 when the substrate 14 is not transparent to pump radiation. In FIG. 12, optical pump sources 16 inject pump radiation into optical fibers 66. The fibers 66 are fed through the substrate 14 between microchannels 24 and terminated in close proximity of back surface 20 of the laser gain medium disk 12, as shown in enlarged fashion in FIG.

13. Downstream ends of the fibers 66 can be polished to incorporate a lens for improved pump radiation coverage of the laser gain medium disk 12.

Another alternative embodiment of the subject invention is intended to suppress parasitic oscillations fed by amplified spontaneous emission (ASE). High laser gain near the back surface 20 could feed parasitic oscillations in the laser gain medium 12. Although usually not a major problem in CW lasers, parasitic oscillations in the laser gain medium disk 12 can be suppressed by grinding the surface 40 (FIGS. 5 and 9) at an angle of about 85–75 degrees with respect to the back surface 20. In addition, the front surface 18 of the disk 12 can be machined at a slight angle of about 1–5 degrees with respect to its back surface 20.

The subject invention is not restricted to a laser gain medium 12 with planar surfaces. FIG. 14 shows an active mirror assembly 200 wherein the laser gain medium disk 12" is configured as an annular section of a spherical shell held to a conforming substrate 14" by a pressure difference between atmosphere 36 and pressure inside microchannels 24". The microchannels are shown in FIG. 15.

A convex mirror 70 is placed in the front of the active mirror assembly 200 so as to form a mirror configuration known as the Cassegranian telescope. This arrangement allows incident laser beam 44 propagating in the direction of telescope axis 72 to enter the telescope through the circular opening 74 and be reflected from the convex mirror 70 into the laser gain medium 12". It is amplified, reflected from the dielectric coating 21, amplified again, and finally exits as the amplified laser beam 44' in a direction parallel to the telescope axis 72. Cooling of the laser gain medium disk 12" can be provided by conductive heat transfer into the substrate 14", in which case the substrate contains heat exchanger 26 (as shown in FIG. 5), or by flowing the coolant 30 through the microchannels 24".

The first embodiment of an amplifier module 300 using active mirror assembly 200 is shown in FIG. 16. Optical pump source 16 generates optical pump radiation 42, which is reflected by a turning flat 76 in the direction of telescope axis 72. The turning flat 76 is a flat piece of optical glass coated on surface 78 to provide high reflectivity at wavelengths of optical pump radiation 42 and high transmission at the wavelength of incident laser beam 44. Surface 80 of the turning flat 76 is coated to provide high transmission at the wavelength of incident laser beam 44.

Optical pump radiation reflected from the turning flat 76 enters the Cassegranian telescope and is reflected from the convex mirror 70 into the laser gain medium 12" where it is largely absorbed. In this configuration of the amplifier module 300, dielectric coating 21 is highly reflective at both the laser and optical pump wavelengths and the dielectric coating 23 is antireflective at both the laser and optical pump wavelengths.

Figure 17:
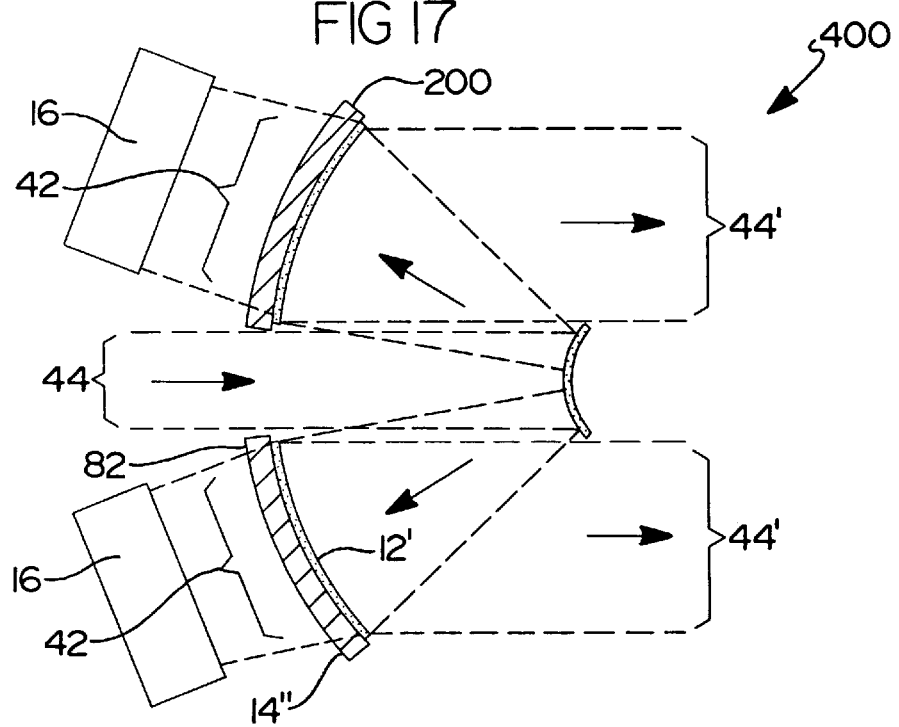
FIG. 17 is another view of the laser module of FIG. 14 being used with an active mirror assembly.

Another embodiment 400 of the amplifier module using active mirror assembly 200 is shown in FIG. 17. This configuration uses substrate 14" transparent to optical pump radiation. Optical pump sources 16 generates optical pump radiation 42, which is directed into the back surface 82' of the optically transparent substrate 14", passes through the substrate 14" and into the laser gain medium 12" where it is absorbed. In this embodiment the dielectric coating 21 on the laser gain medium 12" is highly reflective at the wavelength of the incident laser beam 44 and antireflective at the wavelengths of the optical pump radiation 42 and the dielectric coating 23 is antireflective at the wavelength of incident laser beam 44 and reflective at the wavelengths of the optical pump radiation.

As can be easily recognized by those skilled in the art, the Cassegranian mirror configuration of FIG. 14 could be replaced by the Newtonian mirror configuration.

Figure 18:
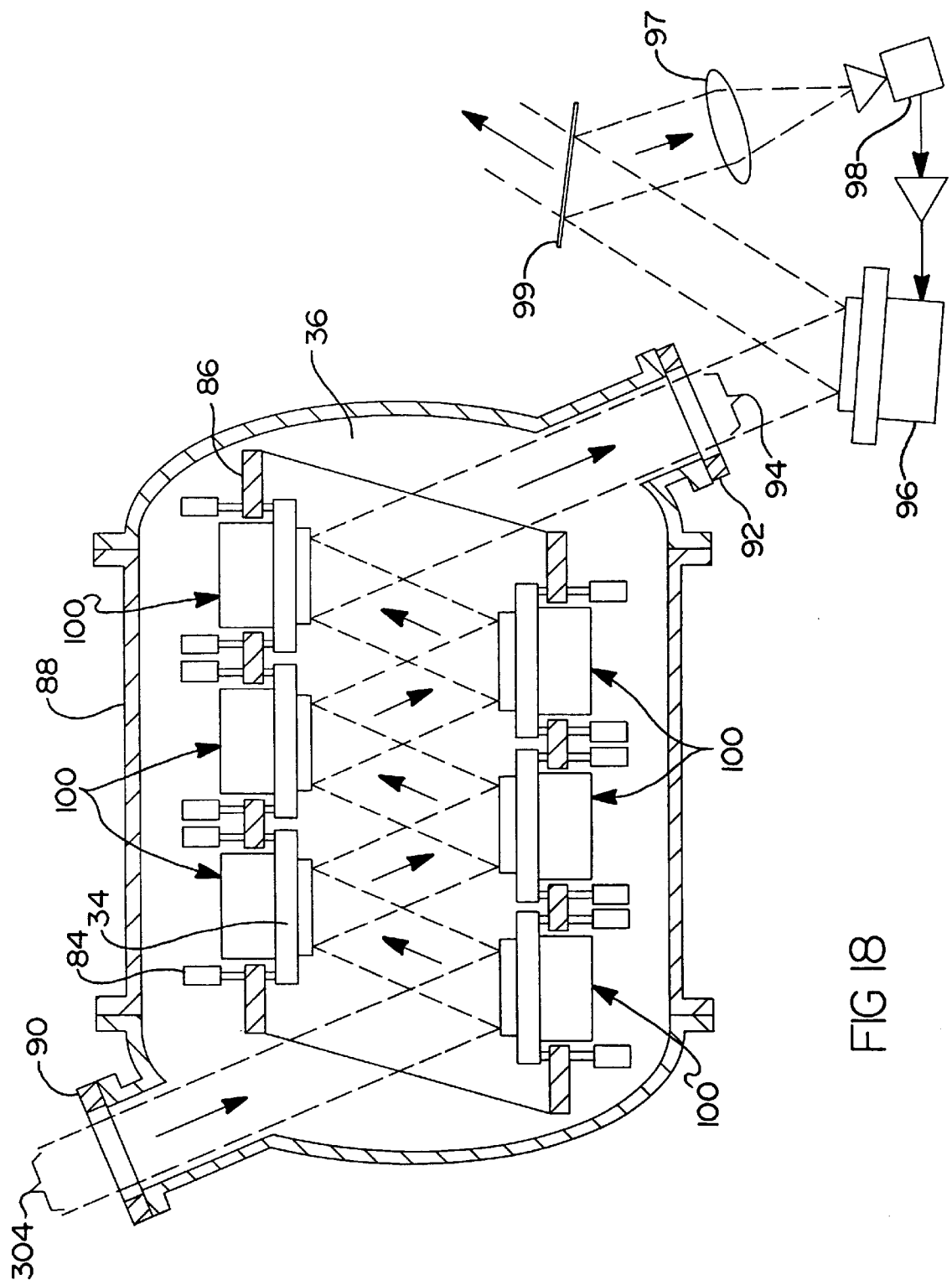
FIG. 18 is a simplified drawing of a power amplifier train using six laser amplifier modules of the present invention.

Solid-state laser modules 10, 100 and 200 can each be used to construct laser oscillators as well as power amplifiers. FIG. 18 shows a laser power amplifier with six modules 100 arranged so as to allow successive amplifications and reflections of a laser beam. Each of the modules 100 includes an optical alignment mount 34 with alignment positioners 84, which hold the modules 100 on a stable platform assembly 86. The entire platform assembly 86 is enclosed in a pressure vessel 88 containing atmosphere 36 of a suitable pressurant gas. Seed laser beam 304 is injected into the vessel 88 through an optical window 90 and into the laser gain medium disk 12 of one of the modules 100 where it is amplified and reflected onto another module 100. After six reflections and amplifications, the amplified laser beam 94 leaves the pressure vessel 88 through an optical window 92. The flow of coolant in each module 100 induces mechanical vibrations of each laser gain medium disk 12. Random vibrations from individual modules 12 may add up to significant jitter in the amplified beam 94. Such jitter can be corrected by directing the amplified beam 94 onto a fast steering mirror 96 operating in a closed loop with a beam position sensor 98. The fast steering mirror 96 reflects the laser beam 94 onto a beam splitter 99 which samples a small fraction of the total beam energy and directs it onto a lens 97 for imaging on the sensor 98.

Figure 19:
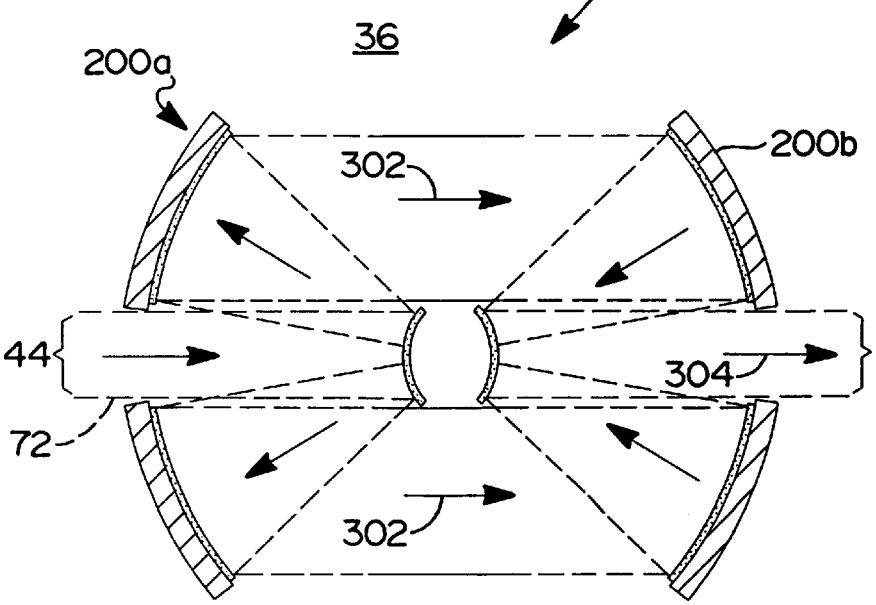
FIG. 19 shows a laser power amplifier with two modules arranged in a Cassegranian expander-compactor configuration.

FIG. 19 shows a laser power amplifier 500 with two modules 200a and 200b arranged in a Newtonian expander-compactor configuration. Incident laser beam 44 enters the module 200a where it is expanded in size and then amplified. Amplified expanded beam 302 is directed parallel to the telescope axis 72 into the second module 200b where it is further amplified and then compacted. Compacted amplified laser beam 304 exits the module 200b parallel to the telescope axis 72. As can be easily recognized by those skilled in the art, similar expander-compactor configuration can be realized by replacing the Cassegranian mirror configuration of amplifier modules 200a and 200b with the Newtonian mirror configurations.

Referring now to FIGS. 20a–20g, during normal operation, the front surface 18 of laser gain medium disk 12 is relatively hot, while back surface 20 is relatively cold. Consequently, disk 12 experiences very high compression near front surface 18 and very high tension near back surface 20. If the disk was unconstrained, the resulting thermal stresses would distort (dish) the medium towards its cooler surface, as shown in FIG. 20b. In a constrained condition shown in FIG. 20c, the medium is flat but experiences increased thermal stresses.

One approach that reduces thermal stresses under operational conditions is to pre-form disk 12 as shown in FIG. 20d. Prior to laser operation, the temperature of disk 12 is uniform. When in constrained condition, material near the front surface 18 experiences tension while the material near the back surface 20 experiences compression. However, during laser operation, the front surface 18 heats up while the back surface 20 remains relatively cool. This generally relieves tension near the front surface 18 and the compression near the back surface 20. It can be shown that this approach reduces stresses in the laser medium by about 50% and allows a corresponding increase in power. The tensile and compressive stresses experienced by the laser gain medium disk when constrained and unconstrained are illustrated in FIGS. 20b, 20c, 20e, 20f and 20g. FIG. 20b illustrates the increased tensile and compressive stresses when the disk 12 is unconstrained and FIG. 20c when it is constrained to a flat condition while at an operating temperature. FIGS. 20f and 20g illustrate the relief and possible reversal of tensile and compressive stresses when the preformed disk 12 is constrained to a flat condition and at an operating condition.

The laser module of the present invention thus provides for significantly improved cooling of the laser medium through the use of a microchannel heat exchanger formed in the substrate, which allows the laser to operate at significantly increased power without overheating. The flexible attachment of the laser medium to the substrate using the pressure differential between the cooling medium and the front surface of the disk eliminates the attachment-induced thermal stresses of prior art designs and allows the laser to operate at significantly increased power without fracturing the medium.

The introduction of pump radiation to the attachment face of the laser gain medium disk through a transparent substrate, heat exchanger and coolant significantly reduces the front to back temperature gradient in the laser gain medium disk, thus allowing the laser to operate at a higher power while eliminating the pump radiation alignment problems of prior art systems. This also allows for tighter packaging of the laser system.

It should be noted that in each of the examples described in the foregoing table, the laser medium disk could be pre-formed, as shown in FIG. 20d before being placed onto a substrate. This would reduce surface stresses by about 50% and allow a corresponding increase in power. The preforming of the laser gain medium disk to achieve a generally flat condition when lasing in an unrestrained condition would enable thermal stresses to be reduced by as much as 50% or more at a given operating point. This would also allow the laser to operate at a significantly increased power level, for example twice the power that could otherwise be used, without fracturing the laser gain medium disk. Still further, this would allow the use of larger diameter and even thicker disks.

The active mirror amplifier system of the subject invention can be operated in a continuous mode where the heat deposited into the laser gain medium 12 is removed in real time, or in a semi-continuous heat capacity mode where the laser gain medium 12 is allowed to gradually warm up. In the latter mode, when the laser gain medium 12 reaches a limiting temperature, the laser operation is suspended, and the medium is allowed to cool down by transferring its thermal energy to the substrate 14 and the cooling medium 30. When the temperature of the laser gain medium 12 has been substantially reduced, lasing operation can be resumed. During the lasing operation some of the heat deposited into the laser gain medium 12 may be removed concurrently, thereby extending the lasing operation.

FIG. 21 is a simplified graph of the heat transfer coefficient realized with the microchannel cooling provided by the preferred embodiments of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:
1. A solid-state laser module comprising:
   a substrate having a front surface and a back surface;
   said substrate having a plurality of channels formed therein; and
   a laser gain medium having a front surface and a back surface, said back surface being in contact with one of said surfaces of said substrate, and said channels being maintained at a reduced pressure such that a pressure differential is created between said back surface of said laser gain medium and said one surface of said substrate to thereby maintain said laser gain medium secured to said substrate.
2. The laser module of claim 1, wherein said laser gain medium has a dielectric optical coating on said back surface thereof to provide high reflectivity at a laser wavelength.
3. The laser module of claim 1, wherein said laser gain medium has an optical coating on said front surface thereof for providing minimum reflectivity at a laser wavelength.
4. The laser module of claim 1, wherein said substrate is cooled.
5. The laser module of claim 1, further comprising a cooling medium flowing through said channels for cooling said laser gain medium.
6. The laser module of claim 1, further comprising an optical pump source for generating collimated optical radiation and directing said radiation into said laser gain medium.
7. The laser module of claim 6, wherein said substrate is fabricated from material transparent to optical pump radiation.
8. The laser module of claim 1, wherein said substrate comprises:
   a backing plate having a plurality of headers for permitting flow of a cooling medium therethrough;
   a manifold plate having a plurality of flow channels in communication with said headers; and
   a heat exchanger plate including said channels, said channels being in communication with said flow channels and with said headers such that said cooing medium can be circulated through said backing plate, through said manifold plate and through said heat exchanger plate to thereby cool said laser gain medium disk.
9. A laser amplifying system comprising:
   a solid body of active laser material adapted for illumination by pumping radiation at pumping wavelengths in a band of wavelengths and from which laser light is emitted in response to said pumping radiation at a wavelength different from said pumping wavelengths;
   a system for providing pump radiation to said solid body;
   a system for providing laser radiation to said solid body for amplification therein;
   a rigid substrate having a plurality of internal passages leading up to one of its surfaces;
   one of said surfaces of said rigid substrate being in contact with a substantial part of at least one of said surfaces of said solid body;
   a system for maintaining fluid pressure inside said internal passages in said rigid substrate substantially lower than the fluid pressure in which the solid body is immersed, to thereby create a pressure differential between said internal passages and said solid body; and
   said pressure differential being sufficient to maintain said one of said surfaces of said solid body in contact with said rigid substrate.

10. The laser amplifying system as defined in claim 9, wherein:

said solid body has two large surfaces opposite to each other and a thickness substantially smaller than the dimensions of said large surfaces;

wherein said laser light passes at a generally normal incidence through a first one of said large surfaces;

wherein said laser light is received at a second one of said large surfaces after passage through said solid body;

said first one of said surfaces including an anti-reflection coating which is substantially totally transmissive of radiation at said laser light wavelength; and said second surface including a coating which is substantially totally reflective of radiation at said laser light wavelength.

11. The laser amplifying system as defined in claim 10, wherein:

said pump radiation is provided to said first surface at generally normal angles of incidence;

said anti-reflection coating on said first surface is substantially totally transmissive of said pump radiation; and said second surface of said solid body receives said pumping radiation that is not substantially absorbed during a single passage through said solid body.

12. The laser amplifying system as defined in claim 11, wherein said second surface has an optical coating which is substantially totally reflective of pumping radiation that is not substantially absorbed during a single passage through said solid body.

13. The laser amplifying system as defined in claim 10, wherein:

the rigid substrate is fabricated from material substantially totally transmissive of said pumping radiation;

said pump radiation is passed through said rigid substrate and is provided to said second surface of said solid body at generally normal angles of incidence;

said anti-reflection coating on said second surface being substantially totally transmissive of said pump radiation; and said first surface of said solid body receiving said pumping radiation that is not substantially absorbed during a single passage through said solid body.

14. The laser amplifying system of claim 13, wherein said first surface of said solid body has an optical coating which is substantially totally reflective of pumping radiation that is not substantially absorbed during a single passage through said solid body.

15. The laser amplifying system of claim 10, wherein:

said rigid substrate has a plurality of penetrations suitable to pass optical fibers to close within proximity of said second surface of said solid body;

said pump radiation is passed through a plurality of optical fibers inserted through said penetrations in said rigid substrate and ends in close proximity of said second surface;

said pump radiation emitted from said optical fiber ends is provided to said second surface of said solid body at generally normal angles of incidence;

an anti-reflection coating on said second surface that is substantially totally transmissive of said pump radiation; and said first surface of said solid body receiving said pumping radiation that is not substantially absorbed during a single passage through said solid body.

16. The laser amplifying system as defined in claim 15, wherein said first surface of said solid body has an optical coating which is substantially totally reflective of pumping radiation that is not substantially absorbed during a single passage through said solid body.

17. The laser amplifying system as defined in claim 10, wherein:

said pump radiation is provided in a direction generally parallel to said large surfaces and to at least one of said surfaces forming a perimeter of said solid body.

18. The laser amplifying system as defined in claim 9, wherein:

a cooling fluid is flowed through said internal passages inside said rigid substrate; and said cooling fluid directly wets said second surface of said solid body and removes heat therefrom.

19. The laser amplifying system as defined in claim 9, where:

heat generated in said solid body is conducted across said second surface into said rigid substrate;

said rigid substrate incorporates a plurality of cooling channels not connected to said internal passages therein; and a cooling fluid is flowed through said cooling channels inside said rigid substrate and removes heat therefrom.

20. The laser amplifying system as defined in claim 10, wherein:

said first and second surfaces of said solid body are planar and generally parallel when subjected to a difference in pressures between an interior of said rigid substrate and an exterior of said first surface of said solid body; and said surface of said rigid substrate facing said second surface of said solid body is planar.

21. A method for forming a laser module comprising the steps of:

providing an optically transparent substrate;

forming a plurality of cooling channels in said substrate at or closely adjacent an outer surface of said substrate;

disposing a laser gain medium against said outer surface of said substrate; and maintaining said cooling channels at a pressure differential relative to a surface of laser gain medium adjacent said substrate such that said substrate is maintained in contact with said laser gain medium by said pressure differential therebetween.

22. The method of claim 21, further comprising the steps of using a bonding agent to maintain said substrate against said laser gain medium.

23. The method of claim 21, further comprising the step of circulating a cooling medium through said cooling channels to cool said laser gain medium.

24. The method of claim 21, further comprising the step of coating a surface of said laser gain medium disposed against said substrate with an optical coating that has a high reflectivity at a laser wavelength.

* * * * *

UNITED STATES PATENT AND TRADEMARK OFFICE
CERTIFICATE OF CORRECTION

PATENT NO. : 6,339,605 B1
DATED : January 15, 2002
INVENTOR(S) : Jan Vetrovec

It is certified that error appears in the above-identified patent and that said Letters Patent is hereby corrected as shown below:

Drawings,
Figure 10, "14" should be -- 14' --
Figure 13, "12" should be added

Column 8,
Line 2, "0.0103cm$^2$" should be -- 0.01032cm$^2$ --

Column 11,
Line 31, after medium, delete "disk"

Column 12,
Line 30, "Newtonian" should be -- Cassegranian --

Column 13,
Line 27, delete "the examples described in the foregoing table" and insert -- Figures 5 through 19 --
Line 32, p.2, line 1, delete "disk"
Line 38, p.2, line 2, delete "disk"
Line 40, p.2, line 3, delete "disks" and insert -- laser gain medium --

Column 14,
Line 40, "cooing" should be -- cooling --

Signed and Sealed this

Twenty-fifth Day of March, 2003

JAMES E. ROGAN
*Director of the United States Patent and Trademark Office*